United States Patent
Sivanandan et al.

(10) Patent No.: US 7,801,519 B2
(45) Date of Patent: Sep. 21, 2010

(54) METHOD AND ARRANGEMENT FOR EXCHANGING CAPABILITY INFORMATION IN A CELLULAR RADIO SYSTEM

(76) Inventors: Mohan L. Sivanandan, 3500 Beringer Ct., Flower Mound, TX (US) 75022; Veijo Vänttinen, Mustarinne 8, FIN-02770 Espoo (FI)

( * ) Notice: Subject to any disclaimer, the term of this patent is extended or adjusted under 35 U.S.C. 154(b) by 928 days.

(21) Appl. No.: 11/646,773

(22) Filed: Dec. 27, 2006

(65) Prior Publication Data

US 2007/0105547 A1    May 10, 2007

Related U.S. Application Data

(62) Division of application No. 10/378,161, filed on Feb. 28, 2003, now Pat. No. 7,177,624.

(30) Foreign Application Priority Data

Feb. 28, 2002   (FI)   .................... 20020385 U

(51) Int. Cl.
    *H04W 24/00*    (2009.01)
(52) U.S. Cl. ..................... 455/424; 370/254
(58) Field of Classification Search ........... 455/424; 370/254
    See application file for complete search history.

(56) References Cited

U.S. PATENT DOCUMENTS

| 5,924,026 | A  |   | 7/1999  | Krishnan ............... 455/414.1 |
| 5,940,759 | A  |   | 8/1999  | Lopez-Torres et al. ....... 455/433 |
| 5,995,823 | A  |   | 11/1999 | Stephens ................. 455/410 |
| 6,061,333 | A  | * | 5/2000  | Joe et al. ................ 370/254 |
| 2004/0009770 | A1 |   | 1/2004 | Sivanandan et al. ......... 455/425 |
| 2007/0105547 | A1 | * | 5/2007 | Sivanandan et al. ......... 455/424 |

FOREIGN PATENT DOCUMENTS

WO        WO 0152583      7/2001

\* cited by examiner

*Primary Examiner*—William D Cumming

(57) ABSTRACT

A method and system for fixed parts of a cellular radio system to exchange capability information with a mobile station of the cellular radio system. The method includes transmitting capability information from the fixed parts of the cellular radio system, and receiving a comparison result at the network element from a mobile station, including a list of matched capability aspects including a higher level aspect and a list of lower level subaspects corresponding to the higher level aspect. The list of matched capability aspects indicates capability information common to the network element and the mobile station.

27 Claims, 5 Drawing Sheets

METHOD AND ARRANGEMENT FOR EXCHANGING CAPABILITY INFORMATION IN A CELLULAR RADIO SYSTEM

CROSS REFERENCE TO RELATED APPLICATIONS

This application is a divisional of U.S. parent application Ser. No. 10/378,161, filed Feb. 28, 2003 now U.S. Pat. No. 7,177,624, which claims priority to Finish patent application No. 20020385, filed Feb. 28, 2002. The aforementioned patent applications are hereby incorporated by reference in their entirety.

TECHNICAL FIELD

The invention concerns generally the technology of exchanging control information between the terminals and base stations of a cellular radio system. Here control information means such information which the terminals and/or base stations may use in controlling the operation of the cellular radio system, as opposed to payload information which is something that the users of the system want to take advantage of. Especially the invention concerns the technology of exchanging such control information which relates to the functional capabilities of the terminals and/or base stations.

BACKGROUND OF THE INVENTION

Digital cellular radio systems of the second generation, such as the known GSM (Global System for Mobile telecommunications), originally relied on all the base stations being substantially equal and all the terminals or mobile stations being substantially equal in functional capabilities. At the priority date of this patent application there is a clear developmental trend towards greater versatility where both base stations and mobile stations may implement various selections of a multitude of functional features. Examples of such features include but are not limited to support for different radio access technologies (e.g. GSM 900, GSM 1800, GSM 1900, IMT2000; the numbers denote approximate frequency ranges in MHz and IMT comes from International Mobile Telecommunication) and support to different radio access features (e.g. EGPRS, ECSD, HSCSD, LCS; Enhanced General Radio Packet Service, Enhanced Circuit Switched Data, High-Speed Circuit Switched Data, Localized Cellular Services). It is assumed that the variety of functional features supported by base stations and mobile stations will even greatly expand in the future. In this patent application we use the general term "capability information" to denote all such information which a communication device in a cellular radio system may announce to other communication devices in order to make them aware of its ability to support and/or exploit certain functional features.

It has been regarded as necessary for the base stations and mobile stations to exchange a certain amount of capability information so that on one hand the network is able to offer to the mobile station such services which the mobile station is both capable and willing to utilize, and on the other hand the mobile station may optimize its operation for example by selecting a cell, from a list of potential candidate cells, which is most optimal in terms of low charges, adequate data rates or some other criterion.

In the following we consider the problem of providing the network (which is a general term describing the fixed parts of a cellular radio system) with capability information concerning the mobile stations operating within the coverage area of the network. From the known GPRS (General Radio Packet Service) specifications there is known a procedure where a mobile station composes an information element known as the RAC IE (Radio Access Capability Information Element) and includes it into certain messages transmitted to the network. Especially MM, RLC/MAC and BSSGP layer messages comprise the RAC IE, where MM, RLC/MAC and BSSGP are names of certain protocol layers and come from Mobility Management, Radio Link Control/Media Access Control and Base Station System GPRS Protocol. Similarly from the known GSM specifications there is known the procedure of sending, from the mobile station to the network, a CM IE or ClassMark Information Element within MM layer messages. The purpose of both the RAC IE and the CM IE is to announce the capabilities of the mobile station to the network.

The continuous expansion of the "feature space" from which an arbitrary selection of features may be supported by the mobile station means that in worst cases the RAC IE and/or the CM IE in their known form may easily become very large. Their inclusion into every MM, RLC/MAC and BSSGP layer message may begin to consume a remarkable portion of radio resources, which in general are scarce and should be reserved to the transmission of only absolutely necessary information. Additionally the introduction of new parts to the already specified information elements may necessitate tedious restandardization.

A straightforward partial solution to the above-mentioned problem would be to reduce the number of transmitted messages containing the RAC IEs and/or the CM IEs. This could be done for example by shortening the list of protocol layers the messages of which are allowed to contain said information elements, or by stating that only every Nth message of a certain protocol layer is allowed to contain said information elements, where N is a positive integer. However, such solutions would seriously cut down the possibilities of providing the network with updated capability information from the mobile stations, which in turn could cause degradation in the subjective level of service which a user experiences.

Another approach to the problem of informing a base station about the capability of a mobile station is to have the functional features of each mobile station listed in a database somewhere in the network, and signalling the capability record concerning a particular mobile station to a base station (or other interested network element) whenever a mobile station has performed a location update within the domain administrated by that base station or other network element. This approach has the drawback of causing a large amount of signalling within the network. It is also inflexible regarding such situations where the capabilities or preferences of a mobile station change, because the central database of capabilities should be updated after each change.

SUMMARY OF THE INVENTION

It is an objective of the present invention to present a method and an arrangement for combining the exchanging of capability information in a cellular radio system with efficient use of radio resources. It is another objective of the invention to assure flexibility and backward compatibility when novel features are added to the selection of potentially implemented capabilities. A further objective of the invention is the applicability of such a method and arrangement in both circuit-switched and packet-switched domains. An even further objective of the invention is to enable arbitrary protocol layers to take part in the exchanging of capability information. An even further objective of the invention is to integrate the exchange of capability information to the selection of networks and cells by the mobile stations.

The objectives of the invention are achieved by letting a number of base stations broadcast a list of capability information relevant to their cells, and by composing the capability information messages in a mobile station so that they only list those capabilities of the mobile station which are currently relevant, given the physical and/or logical location of the mobile station within the cellular radio system.

The invention applies to a method for a mobile station of a cellular radio system to exchange capability information with the fixed parts of the cellular radio system. The method is characterized in that it comprises the steps of:
   receiving capability information from the fixed parts of the cellular radio system,
   comparing the received capability information to a piece of capability information describing the capability of the mobile station and
   transmitting to the fixed parts of the cellular radio system a comparison result that indicates whether matches occurred between the received capability information and said piece of capability information describing the capability of the mobile station.

The invention applies also to a method for a radio access network of a cellular radio system to exchange capability information with a mobile station of the cellular radio system. This method is characterized in that it comprises the steps of:
   transmitting capability information from the fixed parts of the cellular radio system, and
   receiving from a mobile station of the cellular radio system a comparison result that indicates whether matches occurred between the transmitted capability information and the capability of the mobile station.

Additionally the invention applies to a mobile station of a cellular radio system, comprising storage means for storing a piece of capability information describing the capability of the mobile station;

it is characterized in that it comprises:
   receiver means for receiving capability information from the fixed parts of the cellular radio system,
   comparison means for comparing the received capability information to the stored piece of capability information describing the capability of the mobile station and
   transmitter means for transmitting to the fixed parts of the cellular radio system a comparison result that indicates whether matches occurred between the received capability information and the piece of capability information describing the capability of the mobile station.

The invention applies further to a radio access network element of a cellular radio system, arranged to exchange capability information with mobile stations of the cellular radio system; it is characterized in that it comprises:
   storage means for storing a piece of capability information describing the capability of at least a part of the radio access network,
   transmitter means for transmitting capability information describing the capability of at least a part of the radio access network to mobile stations, and
   receiver means for receiving from mobile stations of the cellular radio system comparison results that indicate whether matches occurred between the transmitted capability information and the capability of the mobile stations.

An aspect of the invention stems from the observation that while there may be mobile stations having a wide variety of different capabilities, including those having the most advanced and versatile selection of functional features, in a certain cell at an arbitrarily selected moment of time, it is the capability of the base station of the cell which eventually sets the outer limits to the selection of features which actually can be used in that cell. In other words, it is seldom of any use for the mobile station to announce support for such features which it could not use anyway in its current location due to the limited capability of the serving base station.

In order to take the above-mentioned observation into account, the invention proposes that a base station broadcasts the access technologies, features and possible other capability information describing the capability of its own and possibly certain capabilities of other related network units so that mobile stations receiving the broadcast become aware of these capabilities. As a response to receiving the capability information from the base station, a mobile station composes an information element where it describes its own capability and transmits it within a suitably selected message to the base station. In order not to waste radio resources by transmitting useless information, the mobile station includes into said information element only that part of its overall capability which has some correspondence to the capabilities announced by the base station.

A flexible data structure which is suitable for accommodating the capability information in question is a list, where the listed elements may themselves be lists. In an exemplary embodiment of the invention the base station system (or more generally: the radio access network) broadcasts a list of supported access technologies, where optionally a feature list is associated with each listed access technology. The mobile station may, in its own capability information message, utilize the same structure, or it may compress the message in various ways. A certain way of compressing is to announce such parameters only once which are common to all supported access technologies, and associate only those parameters with the listed access technologies the support for which depends on access technology. A parameter may be e.g. a list of features, where each feature is optionally associated with a further list of feature-dependent parameters or subfeatures.

The generic definition of the information elements in the form of lists makes it very easy to make further modifications, with backward compatibility ensured since a mobile station may completely ignore such further additions in a listed piece of capability information which it does not recognize.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
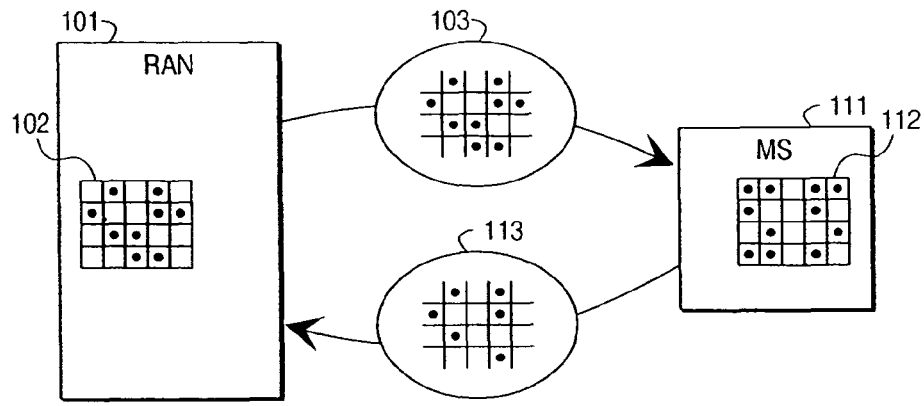
FIG. 1 illustrates the principle of exchanging only relevant capability information.

FIG. 1 is a schematic representation of a radio access network or RAN 101 and a mobile station or MS 111 which is assumed to be within a cell of one of the base stations of the RAN 101. Those parts of the RAN 101 which take part in serving the MS 111 have certain capability regarding, as an example, support for various access technologies and functional features. FIG. 1 illustrates the capability of those parts of the RAN 101 which take part in serving the MS 111 as a matrix 102 where each dot in the matrix means that the corresponding capability exists. Similarly the capability of the MS 111 for utilizing, as an example, various access technologies and functional features is schematically represented as a matrix 112 where each dot in the matrix means that the MS has the corresponding capability.

As a part of the process of exchanging capability information, the RAN 101 transmits a message 103 to the MS 111. The capability of the RAN is the same regarding all those mobile stations that operate within a given cell, so it is most advantageous to transmit the message 103 by broadcasting it through the base station of that cell. Broadcasting means emitting a radio transmission so that more than one mobile station, or even all mobile stations in the cell, may receive the same transmission. Broadcasting is typically accomplished on a broadcast control channel, which in certain cellular radio systems is known as the BCCH. The invention does not require the message 103 to be broadcast on any specific channel; the invention does not even require broadcasting since the objects of the invention would be achieved even if the message 103 were transmitted on a dedicated channel to be received by the MS 111 alone. However, transmitting such information on a dedicated channel which is the same anyway for all mobile stations in a cell is not efficient in terms of consuming radio resources.

The message 103 announces the capability of those parts of the RAN 101 which take part in serving the MS 111. FIG. 1 illustrates this fact so that the capability matrix in the message 103 has exactly the same dots as the capability matrix 102. When the MS 111 has received the message 103, it compares the announced capability of the RAN to its own capability of utilizing the announced access technologies and features. As a response it transmits to the RAN a message 113. The purpose of this message is to announce the capability of the MS 111 to the RAN 101. However, according to the invention the MS does not list its full capability in the message 113, but only reports the coincidences between the capability matrix received in the message 103 and its own capability matrix 112. FIG. 1 illustrates this fact so that the capability matrix in the message 113 has dots only at those locations where there is a dot both in the capability matrix 112 and the capability matrix conveyed in the message 103.

Information is lost in the process illustrated in FIG. 1, because the RAN 101 never becomes aware about the true capability of the MS 111. However, the lost information would not be of any use to the RAN 101, because just knowing that a mobile station could support a certain functional feature does not help if that functional feature is not available at the current location of the mobile station.

A RAN typically comprises a number of cells, and FIG. 1 should not be misunderstood so that the capability matrix 102 should be the same for all cells of the RAN 101. Indeed there may be differently equipped base stations in a single RAN, so that a capability matrix is more a cell-dependent than RAN-dependent feature. However, imagining the capability matrix as being a feature stored only in a base station could be misleading, since at least in the RANs of the third generation cellular systems the trend is towards having the intelligence of the RAN concentrated in a RNC or Radio Network Controller, which is a common controller entity controlling all base stations of the RAN so that the base stations themselves are merely conversion stations where downlink information is converted from a wireline format to radio format and uplink information is converted from a radio format to wireline format. The invention as such does not place limitations to the place of storing and maintaining the capability matrix or, more generally, the capability information relating to a certain cell.

Figure 2:
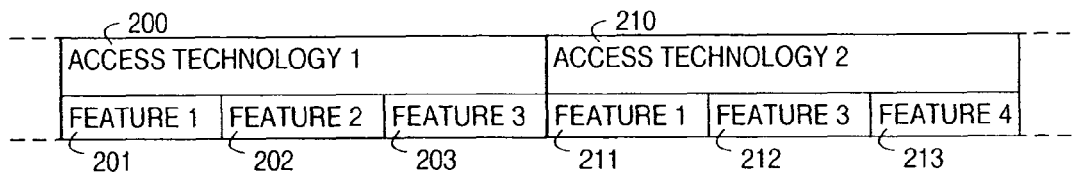
FIG. 2 illustrates an exemplary data structure.

FIG. 2 illustrates schematically an advantageous data structure which can be used to compose the downlink broadcast message which announces the capability of those parts of a RAN which take part in serving MSs in a certain cell. A pseudocode representation of the data structure is $$\text{List of \{Access Technology,\{List of features\}\}} \tag{1}$$

so that the outer list structure is an access technology list that lists all access technologies supported and each entry in the access technology list comprises an identifier of the access technology as well as an inner list structure the elements of which are the features associated with that access technology. In FIG. 2 the elements 200 and 210 are elements of the outer list structure. Within the first of these there is an inner list the elements are designated as 201, 202 and 203, and within the second outer list element 210 there is an inner list the elements of which are designated as 211, 212 and 213. It is typical that certain functional features appear in association with two or more different access technologies, or even all supported access technologies, while there may also be functional features associated with only one access technology. In the example of FIG. 2 the features 1 and 3 are common to both listed access technologies, while feature 2 is unique to access technology 1 and feature 4 is unique to access technology 2. The invention does not limit the number of elements in any of said lists.

Generalizing the Pseudocode Representation (1) to Cover Arbitrary Capability Aspects We Might Present the Pseudocode Representation $$\text{List of \{higher level aspect,\{List of lower level sub-aspects\}\}}$$

where each element in the inner list may itself be a list. Hierarchical listing and partial overlapping are easily generalized to the framework of a more general definition of "capability"; the capability may consist of certain mutually alternative higher level aspects, each of which is in turn associated with a number of lower level subaspects so that certain subaspects may be unique to a certain higher level aspect while other subaspects are common to two or more higher level aspects, or even all higher level aspects. The fact that the elements in the inner list above may themselves be lists means that there may be more than two levels in the hierarchy of aspects and subaspects.

In responding to the RAN the MS could use the same format for the information element conveying capability information as the RAN did in the downlink message, an example of which is shown in FIG. 2. However, because there are far more mobile stations than base stations, and consequently far more uplink messages conveying capability information than downlink ones (taken that broadcasting is used in downlink instead of dedicated channels), it is advantageous if the uplink messages can be compressed to the largest possible extent. The compression may be based e.g. on the fact that there are features common to all listed access technologies (or more generally, subaspects common to all listed aspects).

Figure 3A:
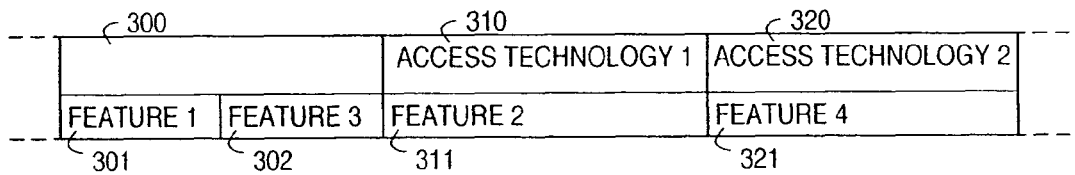
FIG. 3a illustrates another exemplary data structure.

FIG. 3a illustrates an exemplary data structure which can be used to compose a compressed capability information message. A pseudocode representation of the data structure of FIG. 3a is List of common features,List of {Access Technology,
{List of technology dependent features}}          (2)

so that the outer list structure begins with a first list element 300 which itself is a list the elements 301 and 302 of which are the features common to all access technologies. The rest of the outer list structure is an access technology list that lists all access technologies 310 and 320 supported and each entry 311 and 321 in the access technology list comprises an identifier of the access technology as well as an inner list structure the elements of which are the unique features associated with that access technology. In FIG. 3a we have assumed that the capability of the mobile station exactly matches that of the RAN at least regarding access technologies 1 and 2, so that exactly the same access technologies and features are listed in FIG. 3a as in FIG. 2.

If we generalize the pseudocode representation (2) as we did previously with pseudocode representation (1), we get List of common lower level subaspects,List of {higher
level aspect,{List of higher level aspect depen-
dent lower level subaspects}}.

Introducing the concept of parameter so that a feature may itself be either a parameterized value or a number of parameterized values we get List of common parameters,List of {Access Technol-
ogy,{List of access technology dependent param-
eters}} where the list element List of access technology dependent parameters is of the form List of {feature,{List of feature dependent param-
eters}}.

Although compressing is not that important in the downlink direction, it does not cause any harm either and may help to keep the overall consumption of radio resources at minimum. Consequently also the downlink capability information message(s) may well utilize the data structure of FIG. 3a instead of that of FIG. 2.

Figure 3B:
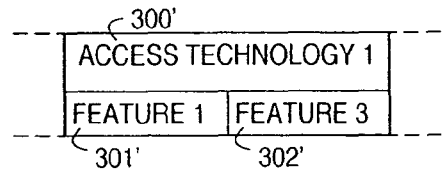
FIG. 3b illustrates another exemplary data structure.

FIG. 3b illustrates the application of the invention in a case where, of the access technologies and features listed in the broadcast capability information of the cell according to FIG. 2, the mobile station supports only access technology 1 and its features 1 and 3. One should note that the mobile station may well support some other capability aspects, like some access technology 3 and/or some features 5, 6 or 7, or even feature 4 in association with access technology 1, or access technology 2 exclusively in association with feature 2. However, these other capability aspects do not match the announced capability of those parts of the RAN which take part in serving the mobile station, so according to the insight presented within the invention it is of no use to announce them to the RAN. Instead, the mobile station's response illustrated in FIG. 3b only consists of a single higher-level list element 300' where access technology 1 is identified, and two lower level list elements 301' and 302' where the supported features associated with that access technology are listed. The form of the response becomes in this case the same regardless of which of the pseudocode representations (1) and (2) is applied in constructing it.

A possibility for very efficient compressing arises if all capability aspects concerned or at least a well defined subset of them are of the type "supported/not supported". Let us assume that capability again consists solely of access technologies and features related to each access technology. Let us further assume that the downlink message broadcast from a base station is of the type shown in FIG. 2, and that the mobile station supports both access technologies listed in the downlink message but only supports features 2 and 3. The data structure shown in FIG. 4 for the uplink capability information message has externally the same form as the data structure of FIG. 2 used in the downlink direction: it has exactly the same fields in exactly the same order. The difference is in the size and value space of the field: for each access technology and each feature the mobile station only announces "supported" or "not supported" with the value of a single bit. Consequently only eight bits need to be transmitted in the uplink direction to tell the RAN, which ones of two possible access technologies and three features related to each access technology are supported by the mobile station. The RAN has itself composed the downlink message, so it is well aware of what was listed therein and in which order, and consequently it is able to decode the eight-bit string received from the mobile station and to convert it into unequivocal capability information describing the mobile station.

For certain capability aspects it is not possible to give a "yes/no" answer. If it is anyhow clear to both the RAN and the MS which capability aspects necessitate a more detailed answer and how many bits are required for each such answer, a hybrid approach may be used where the MS gives a multibit answer regarding those capability aspects where a "yes/no" answer does not suffice, and a single bit for the others. Here again one takes advantage of the fact that the RAN is aware of the number and mutual order of the fields in the broadcast message containing the capability information related to the cell in question. The rules for determining how many bits are required for each individual answer can be laid down in system specifications.

Figure 5A:
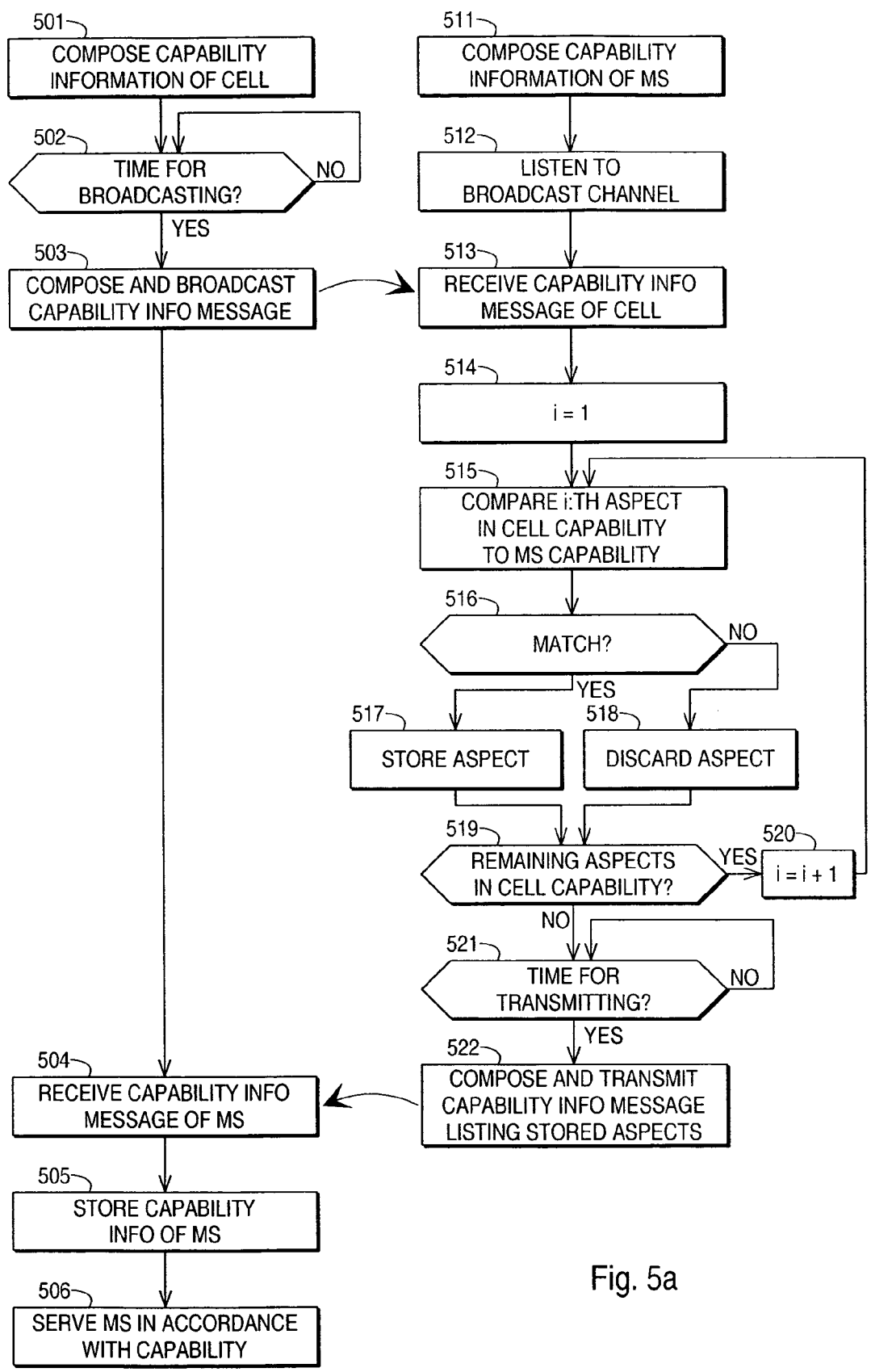
FIG. 5a illustrates a method according to an embodiment of the invention.

FIG. 5a illustrates, in the form of a flow diagram, a method for exchanging capability information according to an embodiment of the invention. The left-hand side of FIG. 5a illustrates the steps taken in the fixed parts of a cellular radio system, more particularly in a RAN and therein in an RNC and/or a base station depending on how the task of handling capability information is distributed. At step 501, the capability information is generated. As we have noted earlier, step 501 typically corresponds to generating a certain list or matrix of capability information separately for each cell. The generated capability information is stored into a location from which it can be read when it is time to broadcast it to the mobile stations, or a number of mobile stations, operating within the corresponding cell. Step 502 represents the time of waiting for the correct moment of broadcasting a message, a part of which is to be constituted by the capability information generated at step 501. When the correct moment comes, the message is transmitted at step 503.

Figure 5B:
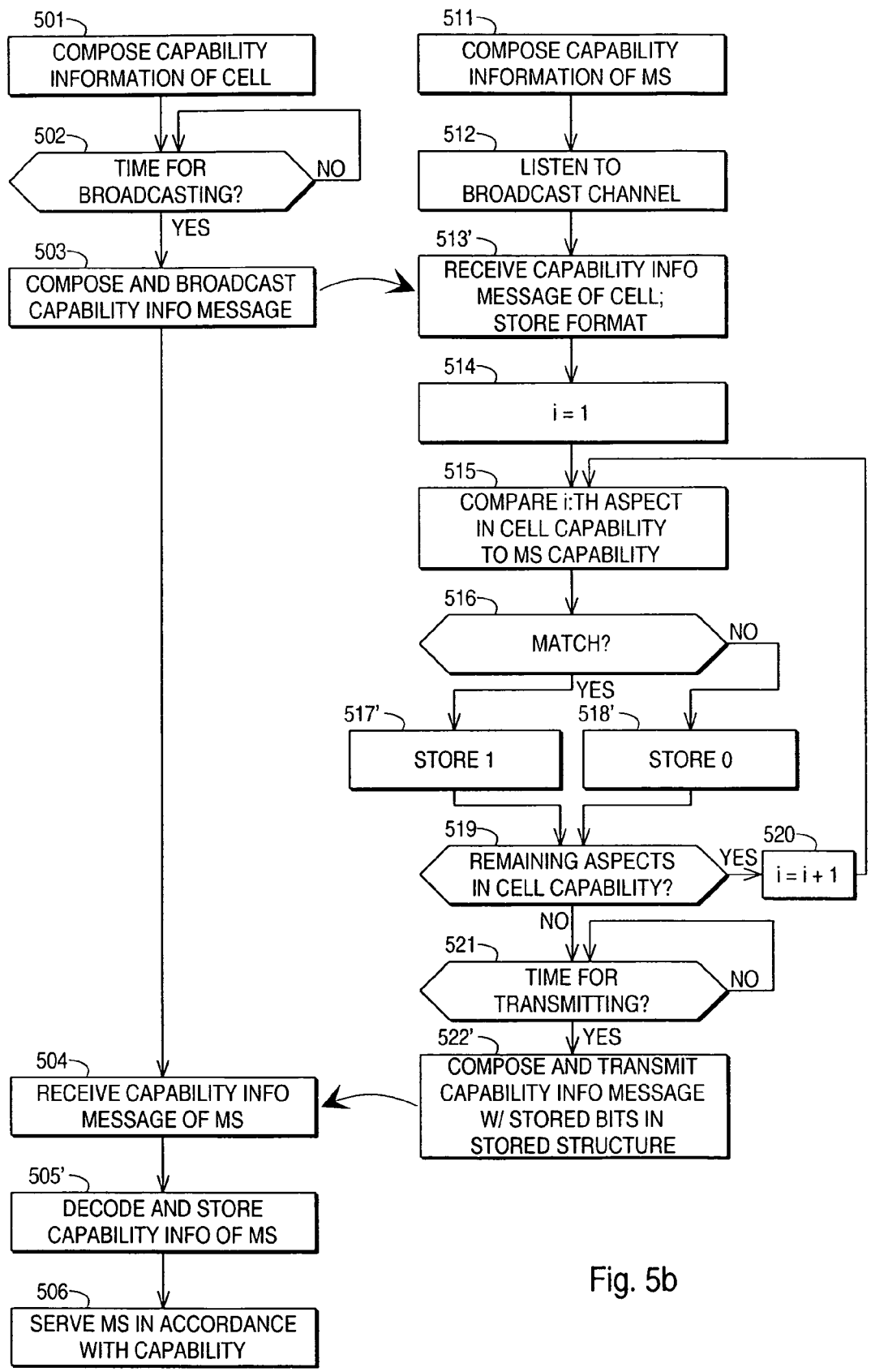
FIG. 5b illustrates a method according to another embodiment of the invention.

The right-hand side of FIG. 5b illustrates the steps taken in a mobile station. At step 511 the mobile station generates and stores its own capability information. At step 512 the mobile station listens to a general broadcast channel in the cell where it is operating. After the capability information message has got transmitted from the network side, the mobile station receives it at step 513.

Step 514 means just the initialization of an index the values of which refer to the different capability aspects announced in the received message. At step 515 the mobile station compares one of the capability aspects to its own capability information. A match at step 516 means that the mobile station supports the use of the capability aspect in question, whereby the capability aspect or some value representing it is stored at step 517. If no match was found, that capability aspect is discarded at step 518.

Step 519 is a check for whether all capability aspects in the received message have been gone through. If not, the index i is incremented at step 520 and the comparison round is started anew from step 515. After having considered all capability aspects announced in the received message, the mobile station goes into step 521 where it waits for the correct moment for transmitting its capability response message to the network. When the correct moment comes, the mobile station composes and transmits the message at step 522. The step of composing the message may naturally have been performed already earlier, so that at step 522 the completed message is only read from its storage location and transmitted.

At step 504 the network receives the capability information message from the mobile station. At step 505 it stores the mobile station's indicated capability into s suitable storage location or signals it further in the network to a network device which acts as the storage of indicated mobile station capabilities. Step 506 corresponds to offering such services to the mobile station which in some predefined sense take into account the indicated capability of the mobile station.

Figure 4:
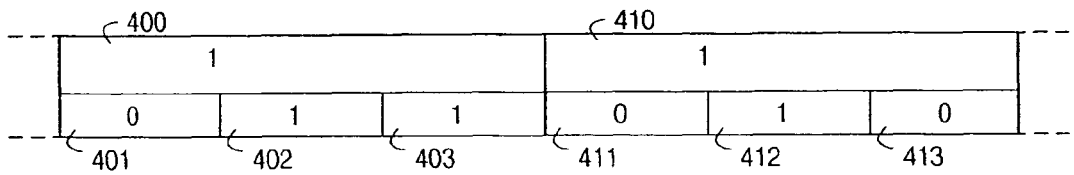
FIG. 4 illustrates another exemplary data structure.

FIG. 5b illustrates a modification to the method of FIG. 5a, where the differences arise from the fact that the mobile station uses the response strategy illustrated in FIG. 4. As a difference to the method of FIG. 5a, at step 513' the mobile station stores the exact format (number and order of fields as well as the relation between fields and announced capability aspects) of the received information element containing capability information. At steps 517' and 518' the mobile station stores different bit values depending on whether a certain announced capability aspect matches the capability of the mobile station. At step 522' the mobile station composes the response message so that the information element containing capability information has exactly the same format which it had in the capability information message broadcast at step 503 and the bit values in the fields indicate which capability aspects are supported by the mobile station. At step 505' the RAN decodes the response message, which means that it compares the response message to the known form of the broadcast message and converts the received one-bit answer values into capability information representing the capability of the mobile station.

The timing of the transmission steps 503 and 522 (or 522') as well as the protocol layers involved deserve some consideration. In cellular radio systems there typically has been defined a broadcast control channel or some differently designated channel for the purposes of delivering, within each cell, information which is of general importance for all mobile stations operating in a particular cell. The transmissions on the broadcast control typically occur according to a cyclically defined timetable so that a certain message gets transmitted regularly or nearly regularly, say N times in every M seconds where N is a positive integer and M is a positive real number. The capability information may occur in any number of messages on the broadcast control channel. An optimal timetable for the occurrence of capability information may be constructed through experimenting and simulating.

In addition to regularly broadcasting the capability information to all mobile stations in a cell, it may be worthwhile to transmit it to a certain mobile station alone as a part of some process where an active communication connection is set up between a base station and a mobile station, or preparations are made for later quickly setting up an active communication connection between a base station and a mobile station.

The correct timing for the mobile stations to transmit their responding capability information messages should be carefully selected in order not to unnecessarily delay the accumulation of mobile-related capability information in the network on on hand but also not to cause too frequent signalling over the radio interface on the other hand. It is not reasonable to make all mobile stations always respond to all capability information messages broadcast in a cell, since the dwelling time of a mobile station in a certain cell is typically much longer than the interval between two consecutive capability information broadcasts; subsequent responses from mobile stations that just duplicated already transmitted information would consume radio resources to no avail. One solution for selecting the moments when the mobile station transmits its capability information is such where the mobile station always transmits it when entering a cell. In addition to that it may be defined that the mobile station always transmits its capability information as a part of a location update message. Additionally it may be useful to obligate a mobile station to transmit its capability information when explicitly requested by the network.

The capability information itself is partly independent of protocols, at least concerning capability aspects like operational frequency bands which are just vehicles for implementing communication irrespective of protocols. On the other hand the ability of implementing certain protocols may constitute an important part of capability information. The invention does not limit the selection of protocol layers which are involved in exchanging capability information. There may be different kinds of messages including capability information, so that if the message belongs to a protocol layer X, the capability information listed therein may comprise all capability aspects which are relevant for using just protocol layer X (and the lower protocol layers below it) but nothing else. Here X may be for example the MM layer or the RLC/MAC layer. However, the invention does not rule out the use of general capability information messages where all capability aspects related to a cell are announced at once, and the mobile stations respond by reporting the selected ones of the announced capability aspects which match their capability.

Figure 6A:
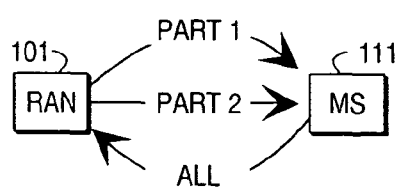
FIG. 6a illustrates a first principle of gradual mapping.

Especially if the selection of capability aspects to be listed is large, it may become unadvantageous to list the whole selection in one message. The invention enables the network to perform gradual mapping of the capability of the mobile stations. Let us assume that the capability related to a certain cell consists of capability aspects A, B, C, D and E. In a first embodiment of the gradual mapping principle, illustrated in FIG. 6a, the capability information broadcast in a cell is distributed by the RAN 101 into a number of different messages, which number in this exemplary case is two. The first message lists a first part of the capability related to a certain cell, say capability aspects A, B and C, and the second message lists the rest of the capability aspects which in this example are the aspects D and E. The reception of the different messages at the mobile station 111 causes steps 513 to 520 (or 513' to 520') to be performed separately to each part of the listed capability aspects, but the mobile station transmits only one response message which includes all answers.

Figure 6B:
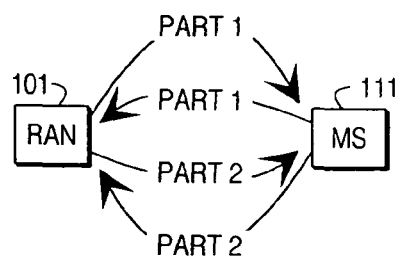
FIG. 6b illustrates a second principle of gradual mapping.
Figure 6C:
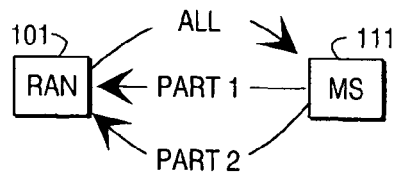
FIG. 6c illustrates a third principle of gradual mapping.

FIG. 6b illustrates an alternative embodiment of gradual mapping where the RAN broadcasts its capability information in several parts, and the mobile station responds to each broadcast message as if it was the only one. FIG. 6c illustrates still another alternative where the RAN broadcasts its capability information in a single message but the mobile station gives partial responses, the reason being for example the small size of uplink radio resource units allocated for transmitting the responses. In all cases where all capability information is not transmitted at once, it may be advantageous to add into each partial message an indicator the value of which indicates whether or not the partial message is the last one in a series of partial messages. The principle of gradual mapping of capability information may require that the device which receives capability information in parts is capable of accumulatively storing the parts, i.e. so that later writings do not overwrite previously collected information unless exactly same capability aspects are concerned.

Above we have only considered cases where the mobile station is "honest" in the sense that it discloses to the RAN all of its capability aspects that match those broadcast by the RAN. In some cases it may happen that although there would be a (large) number of matching capability aspects, it is more advantageous for the mobile station not to disclose them all to the RAN. This is especially the case if there are some reasons to expect that disclosing a certain matching capability aspect to the RAN would cause the RAN to classify the mobile station into a group of mobile stations which do not receive as advantageous service as would be possible. For example, the mobile station might be capable of using HSCSD, but it is known that HSCSD services are (at least in the current location of the mobile station at the current time instant) very expensive to use and additionally the data which the user of the mobile station would like to be transmitted could as well be transmitted over a slower and cheaper connection. In such a case the mobile station might not "confess" its HSCSD capability aspect. The user of the mobile station may have instructed the mobile station to do so, or the mobile station could prompt the user to select, whether or not he would like to utilize the mobile station's HSCSD capability at the moment.

Figure 7:
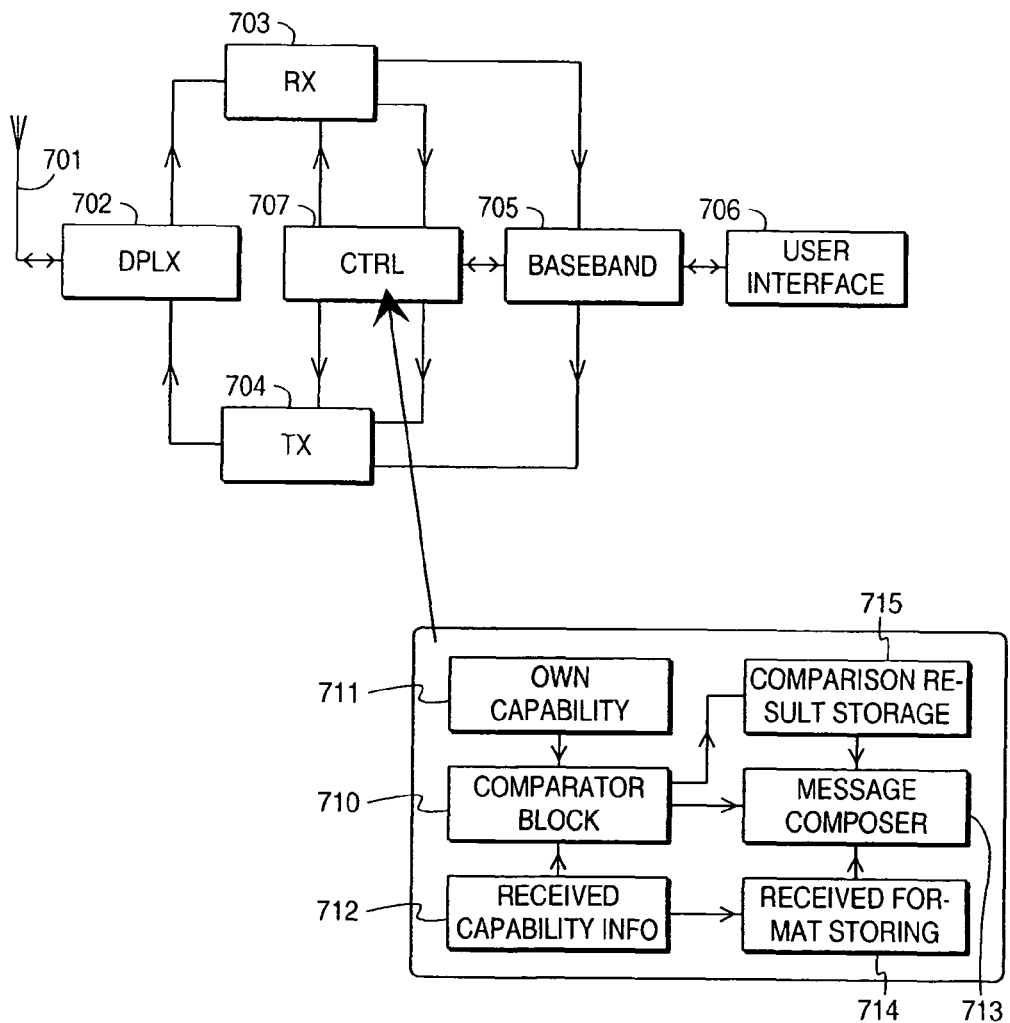
FIG. 7 illustrates a mobile station according to an embodiment of the invention and FIG. 8 illustrates a radio network controller according to an embodiment of the invention.

FIG. 7 illustrates schematically certain parts of a mobile station according to an embodiment of the invention. An antenna 701 is coupled through a duplexing block 702 to a receiver block 703 and a transmitter block 704. The sink of payload data from the receiver block 703 and the source of payload data to the transmitter block 704 is a baseband block 705 which in turn is coupled to a user interface block 706 for communicating with a human or electronic user. A control block 707 receives control information from the receiver block 703 and transmits control information through the transmitter block 704. Additionally the control block 707 controls the operation of the blocks 703, 704 and 705.

In accordance with the invention, the control block 707 comprises a comparator block 710 which is arranged to compare the mobile station's own capability information stored in an appropriate storage location 711 to that found in a temporary storage location 712 for received capability information. The results of the comparison are stored in a comprison result storage 715 which, together with the comparator block 710, is coupled to a message composer block 713 the task of which is to compose the messages in which the mobile station reports the matches between broadcast capability aspects and those of its own. In case the ultimately compressed response format of FIG. 4 is used, there is a block 714 of its own for storing the format of the received information element which carried the broadcast capability information. The functional blocks 710 to 715 are most advantageously implemented by programming the corresponding operations into computer-executable processes and utilizing selected ones of the memory elements at the disposal of the control block 707 as the storage locations.

Figure 8:
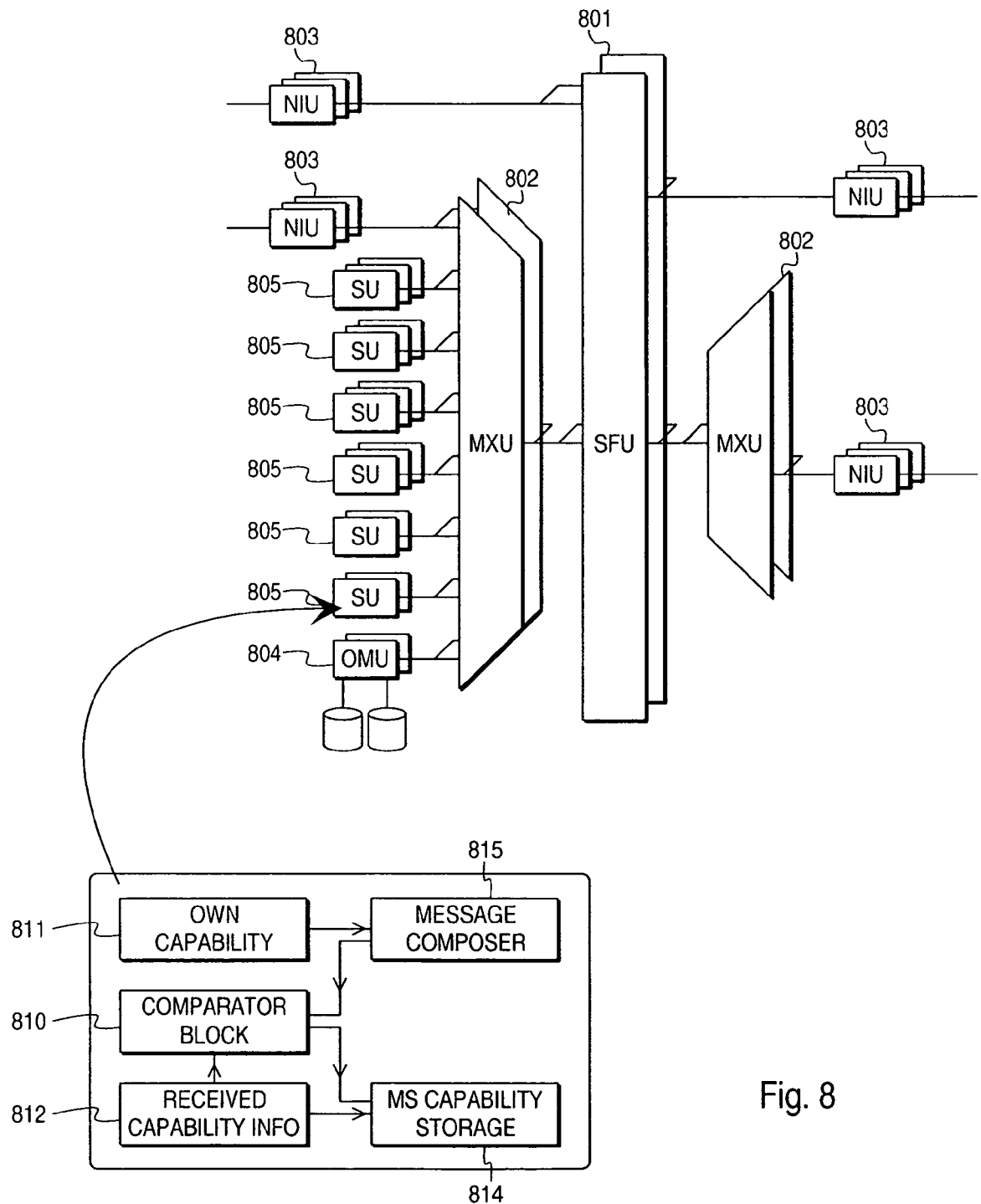

FIG. 8 defines a functional structure of a typical RNC of a cellular radio system, more exactly of a UMTS (Universal Mobile Telecommunication System) radio network utilizing WCDMA (Wideband Code Division Multiple Access). The invention must naturally not be considered to be limited thereto. The invention can also be used in other types of cellular radio systems.

The RNC of FIG. 8 comprises a SFU (Switching Fabric Unit) 801 to which several control processor units can be connected. Reliability is typically enhanced by providing hardware level redundancy in the form of parallel redundant units. MXUs (Multiplexing Units) 802 can be used between a number of processor units and the SFU 801 to map the low bitrates from the processor units into the high bitrates of the SFU input ports. The NIUs (Network Interface Units) 803 handle the physical layer connection to different interfaces (e.g. Iub interface towards Node B:s, Iur interface towards other RNCs, Iu interface towards core network nodes). The OMU (Operations and Maintenance Unit) 804 contains the RNC configuration and fault information and can be accessed from an external operations and maintenance center. The SUs (Signalling Units) 805 implement all the control and user plane protocols required in the RNC. Thus, the invention can be implemented in RNC in the Signalling Units by providing therein the own capability storages 811, temporary storages for received capability information 812, comparator units 810 (in case the received capability information must be decoded from single-bit values coming in a certain order duplicating that in the broadcast messages) and mobile station related capabilitity information storages 814.

The terms used in the description above that relate to some specific cellular radio system should not be construed as limiting the applicability of the invention to other cellular radio systems. The features recited in the depending claims are freely combinable unless otherwise explicitly stated.

What is claimed is:

1. A method comprising:
    transmitting capability information from a network element of a cellular radio network; and
    receiving a comparison result at the network element from a mobile station, wherein the comparison result comprises a list of matched capability aspects including a higher level aspect and a list of lower level subaspects corresponding to the higher level aspect, and wherein the list of matched capability aspects indicates capability information common to the network element and the mobile station.

2. The method of claim 1, wherein the list of matched capability aspects comprises a data structure:

List of {higher level aspect,{List of lower level subaspects}}.

3. The method of claim 1, wherein the transmitting capability information comprises broadcasting cell-dependent capability information of a cell, and wherein the broadcasted cell-dependent capability information is receivable at a plurality of mobile stations within the cell.

4. The method of claim 1, wherein the higher level aspect includes an access technology, and wherein the lower level subaspects include features associated with the access technology.

5. The method of claim 4, wherein the list of matched capability aspects comprises a data structure:

List of {Access Technology,{List of features}}.

6. The method of claim 1, wherein the capability information comprises:
   a second list of lower level subaspects common to all higher level aspects included in the capability information;
   at least one of the higher level aspects included in the capability information; and
   a third list of lower level subaspects uniquely associated with the at least one of the higher level aspects.

7. The method of claim 6, wherein the capability information comprises a data structure:

List of common lower level subaspects,List of {higher level aspect,{List of high level aspect dependent lower level subaspects}}.

8. The method of claim 6, wherein the higher level aspects are access technologies, and wherein the lower level subaspects are parameters associated with the access technologies.

9. The method of claim 6, wherein the third list of lower level subaspects comprises a feature and a list of parameters associated with the feature.

10. The method of claim 1, further comprising storing the list of matched capability aspects at the network element.

11. The method of claim 1, wherein the list of matched capability aspects comprises a list of indicator values, wherein each indicator value of the list of indicator values is one of two allowable values, and the method further comprises:
    comparing the list of indicator values to the transmitted capability information; and
    storing a result of the comparing at the network element.

12. The method of claim 11, wherein the list of matched capability aspects further comprises multi-bit indicators.

13. The method of claim 1, further comprising comparing a received message comprising the list of matched capability aspects to a form of a transmitted message comprising the capability information.

14. The method of claim 1, wherein the transmitting capability information comprises transmitting capability information in several parts; and wherein the receiving the comparison result comprises receiving the comparison result in several parts.

15. A radio network element comprising:
    a transmitter configured to transmit capability information to a mobile station, wherein the capability information describes a capability of an element of a cellular radio network; and
    a receiver configured to receive a comparison result from the mobile station, wherein the comparison result comprises a list of matched capability aspects including a higher level aspect and a list of lower level aspects corresponding to the higher level aspect, and wherein the list of matched capability aspects indicates capability information common to the element of the cellular radio network and the mobile station.

16. The radio network element of claim 15, further comprising a storage element configured to store the capability information and the list of matched capability aspects.

17. A cellular radio system comprising:
    a network element including
      a transmitter configured to transmit first capability information of the network element to a mobile station, wherein the capability information describes a capability of the network element; and
      a first receiver configured to receive a comparison result from the mobile station, wherein the comparison result comprises a list of matched capability aspects including a higher level aspect and a list of lower level aspects corresponding to the higher level aspect, and wherein the list of matched capability aspects indicates capability information common to the element of the cellular radio network and the mobile station; and
    the mobile station including
      a second receiver configured to receive the first capability information from the network element;
      a comparator configured to compare the first capability information to second capability information of the mobile station and generate the list of matched capability aspects; and
      a transmitted configured to transmit comparison result comprising the list of matched capability aspects to the network element.

18. The system of claim 17, wherein the network element further comprises a first storage element configured to store the first capability information and the list of matched capability aspects, and wherein the mobile station further comprises a second storage element configured to store the second capability information and the list of matched capability aspects.

19. A method comprising:
    transmitting, from a network element, first capability information of the network element of a cellular radio network;
    receiving the first capability information at a mobile station;
    comparing, at the mobile station, the first capability information to second capability information of the mobile station;
    generating a comparison result at the mobile station, wherein the comparison result comprises a list of matched capability aspects including a higher level aspect and a list of lower level subaspects corresponding to the higher level aspect, and wherein the list of matched capability aspects indicates capability information common to the network element and the mobile station;
    transmitting the comparison result from the mobile station to the network element; and
    receiving the comparison result from the mobile station at the network element.

20. The method of claim 19, wherein the list of matched capability aspects comprises a data structure:

List of {higher level aspect,{List of lower level subaspects}}.

21. The method of claim 19, wherein the transmitting first capability information comprises broadcasting cell-dependent capability information of a cell, and wherein the broadcasted cell-dependent capability information is receivable at a plurality of mobile stations within the cell.

22. The method of claim 19, wherein the higher level aspect includes an access technology, and wherein the lower level subaspects include features associated with the access technology.

23. The method of claim 19, wherein the capability information comprises:
    a second list of lower level subaspects common to all higher level aspects included in the capability information;
    at least one of the higher level aspects included in the capability information; and a third list of lower level subaspects uniquely associated with the at least one of the higher level aspects.

24. The method of claim 23, wherein the capability information comprises a data structure:

> List of common lower level subaspects,List of {higher level aspect,{List of high level aspect dependent lower level subaspects}}.

25. The method of claim 23, wherein the higher level aspects are access technologies, wherein the lower level subaspects are parameters associated with the access technologies, and wherein the third list of lower level subaspects comprises a feature and a list of parameters associated with the feature.

26. The method of claim 19, further comprising storing the list of matched capability aspects at the network element.

27. The method of claim 19, wherein the list of matched capability aspects comprises a list of indicator values, wherein each indicator value of the list of indicator values is one of two allowable values, and the method further comprises:
  receiving the list of indicator values at the network element from the mobile station;
  comparing, at the network element, the list of indicator values to the transmitted capability information; and
  storing a result of the comparing at the network element.

* * * * *